(12) United States Patent
Klitschke et al.

(10) Patent No.: US 9,290,621 B2
(45) Date of Patent: Mar. 22, 2016

(54) COMPOSITION FOR ANIONIC LACTAM POLYMERIZATION

(71) Applicant: BrüggemannChemical L. Brüggemann KG, Heilbronn (DE)

(72) Inventors: Jan Klitschke, Heilbronn (DE); Klaus Bergmann, Heilbronn (DE)

(73) Assignee: BruggemannChemical L. Bruggemann KG, Heilbronn (DE)

( * ) Notice: Subject to any disclaimer, the term of this patent is extended or adjusted under 35 U.S.C. 154(b) by 0 days.

(21) Appl. No.: 14/522,324

(22) Filed: Oct. 23, 2014

(65) Prior Publication Data

US 2015/0045531 A1 Feb. 12, 2015

Related U.S. Application Data

(62) Division of application No. 13/462,666, filed on May 2, 2012, now abandoned.

(30) Foreign Application Priority Data

May 3, 2011 (EP) .................................... 11003614

(51) Int. Cl.
| | | |
|---|---|---|
| C08G 69/00 | (2006.01) | |
| C08G 69/14 | (2006.01) | |
| C08G 69/16 | (2006.01) | |
| C08G 69/18 | (2006.01) | |
| C08G 69/20 | (2006.01) | |
| C08G 18/73 | (2006.01) | |
| C08G 18/34 | (2006.01) | |

(52) U.S. Cl.
CPC ............... *C08G 69/00* (2013.01); *C08G 18/34* (2013.01); *C08G 18/73* (2013.01); *C08G 69/14* (2013.01); *C08G 69/16* (2013.01); *C08G 69/18* (2013.01); *C08G 69/20* (2013.01)

(58) Field of Classification Search
CPC ........ C08G 69/14; C08G 69/16; C08G 69/18; C08G 69/20; C08G 18/34; C08G 18/73
USPC .................................................... 528/48, 73
See application file for complete search history.

(56) References Cited

U.S. PATENT DOCUMENTS

| | | |
|---|---|---|
| 3,553,175 A | 1/1971 | Ruyter |
| 4,191,819 A * | 3/1980 | Meyer et al. ............... 528/315 |
| 4,540,515 A | 9/1985 | van Geenen et al. |
| 4,611,034 A | 9/1986 | Meyer et al. |
| 4,684,746 A | 8/1987 | Meyer et al. |
| 4,757,095 A | 7/1988 | Galan et al. |
| 5,587,421 A | 12/1996 | Weyland et al. |
| 5,684,119 A | 11/1997 | Michaud et al. |
| 5,760,164 A | 6/1998 | Schmid et al. |
| 6,663,962 B2 * | 12/2003 | Le Crom et al. ............... 428/402 |
| 2002/0049285 A1 | 4/2002 | Abe |
| 2010/0113661 A1 | 5/2010 | Senff et al. |
| 2012/0088899 A1 * | 4/2012 | Scherzer et al. ............... 528/325 |

FOREIGN PATENT DOCUMENTS

| | | |
|---|---|---|
| CN | 101578319 A | 11/2009 |
| EP | 0 134 616 B1 | 12/1987 |
| EP | 0 135 233 B1 | 2/1988 |
| EP | 0 167 907 B1 | 3/1992 |
| EP | 0 697 424 B1 | 2/1996 |
| EP | 0 697 424 B2 | 2/1996 |
| EP | 0 786 482 B1 | 7/1997 |
| EP | 0 786 482 B2 | 7/1997 |
| EP | 1 449 865 A1 | 8/2004 |
| WO | WO 00/42091 A2 | 7/2000 |

OTHER PUBLICATIONS

Official Action from European Patent Office re extended European search report, dated Oct. 11, 2011, for Patent Application No. 11003614.2, 5 pages.
Official Action from European Patent Office re extended European search report, dated Aug. 7, 2012, for Patent Application No. 12003252.9, 7 pages.
Response to Official Communication re extended European search report, dated May 7, 2013, for Patent Application No. 12003252.9, 5 pages.
Official Action from State Intellectual Property Office of China, dated Dec. 10, 2013, for Patent Application No. 201210135752.X, 7 pages.
Official Action from State Intellectual Property Office of China, dated Aug. 5, 2014, for Patent Application No. 201210135752.X, 14 pages, with translation.
Official Action from State Intellectual Property Office of China, dated Dec. 25, 2014, for Patent Application No. 201210135752.X, 13 pages, with translation.
Official Action from State Intellectual Property Office of China, dated Jul. 2, 2015, for Patent Application No. 201210135752.X, 8 pages, with translation.

\* cited by examiner

*Primary Examiner* — Michael L Leonard
(74) *Attorney, Agent, or Firm* — Seed IP Law Group PLLC

(57) ABSTRACT

A composition comprising a) at least one aliphatic or cycloaliphatic isocyanate compound having at least two isocyanate groups and b) at least one lactone, containing 4 to 7 carbon atoms and use of the composition as an activator for anionic lactam polymerization to obtain polyamides.

12 Claims, No Drawings

COMPOSITION FOR ANIONIC LACTAM POLYMERIZATION

FIELD OF THE INVENTION

This invention relates to a composition for the preparation of polyamides by activated anionic polymerization of lactams.

BACKGROUND OF THE INVENTION

The activated anionic polymerization of lactams is used in numerous different processes for the manufacture of polyamide shaped products. Unproblematic polymerization and the quality of the polyamides prepared by the various processes depend not only on the catalyst but to a large extent also on the nature of the activator used.

Numerous compounds have been used as activators for the anionic polymerization of lactams, i.e. acyl lactams (EP1449865), oxazolines (EP0786482), ethylenebisamides (US2010/0113661), isocyanates and the corresponding masked isocyanate compounds.

Polyisocyanates or isocyanates, particularly diisocyanates, are frequently used as activators. Hexamethylene diisocyanate is particular preferred since it is a highly mobile liquid and as such affords considerable advantage, particularly in continuous process in which accurate delivery by dosing pumps is important. One serious disadvantage of the use of hexamethylene diisocyanate, however is its toxicity which is due to its high vapor pressure and which necessitates special safety measures.

In order to overcome this disadvantage blocked isocyanate compounds have been used. Caprolactam was used as one of such masking agents, forming hexamethylene biscarbamide caprolactam which has been classified as physiologically harmless.

Other liquid activator systems for anionic lactam polymerization are known in which isocyanate compounds are mixed with pyrrolidone compounds, e.g. N-methyl pyrrolidone or N-ethyl pyrrolidone (EP0167907). One serious disadvantage of pyrrolidones, however, is their toxicity. According to EU regulation (EC) No 1272/2008 N-methyl pyrrolidone has been classified as being toxic for reproduction.

EP0697424 A1 discloses compositions comprising organic solvents and polyisocyanates which may be emulgated in water. These compositions are intended for use in the preparation of aqueous dispersions which may in turn be employed as additives for adhesives, impregnating compositions and coating compositions. In order to render the polyisocyanates suitable for forming an emulsion in water, they have at least partially been reacted with compounds providing hydrophilic moieties on the polyisocyanate compounds.

WO 00/42091 discloses an antistatic molded resin article comprising a polyester amide resin prepared by copolymerizing a cyclic amide and specific cyclic esters.

EP0134616 A1 and EP0135233 A1 disclose N-substituted carbamoyl-lactam compounds which are described as suitable promoters or activators for anionic polymerization of lactams. These two prior art documents correspond to the basic concept identified above to use blocked isocyanate compounds.

U.S. Pat. No. 4,757,095 discloses lactones and lactams which may be utilized in the preparation of urethane modified pre-polymers which may be employed for preparing micro cellular foams.

U.S. Pat. No. 5,684,119 discloses directly shapeable clear solutions of polyamide imides which may be employed for the preparation of yarns and fibers.

Additionally, in order to increase the impact strength of the obtained polyamides, impact modifiers, such as polyetheramines have to be added to the anionic polymerization of lactams. However, conventional liquid activator systems coagulate when supplied together with such impact modifiers in the reaction container. To overcome this problem, separate addition means are required, which complicates the polymerization process. Sometimes the impact modifiers are mixed with the polymerization catalyst before the addition to the lactam melt which unavoidably leads to a decrease of the catalyst activity, since polymerization catalysts for anionic lactam polymerization are highly hygroscopic.

An object of this invention is to provide a composition for anionic lactam polymerization which does not contain any pyrrolidone compounds, particularly no N-alkyl pyrrolidone compounds and which is storage-stable and leads to polyamides of excellent quality.

DETAILED DESCRIPTION OF THE INVENTION

This object has been achieved with a composition comprising as component a) at least one aliphatic or cycloaliphatic isocyanate compound having at least two isocyanate groups and as component b) at least one lactone, containing 4 to 7 carbon atoms, and by the use of the composition for anionic lactam polymerization.

Suitable compounds for component a) are aliphatic or cycloaliphatic isocyanate compounds having at least two isocyanate groups. Diisocyanate compounds are preferred, which may be selected from the group of isophorone diisocyanate (IPDI), 4,4'-diisocyanato dicyclohexylmethane ($H_{12}$MDI), 1,6-hexamethylene diisocyanate (HDI), poly(isophorone diisocyanate), poly(4,4'-diisocyanato dicyclohexylmethane), poly(1,6-hexamethylene diisocyanate). The preferred diisocyanate compounds are 1,6-hexamethylene diisocyanate (HDI) and poly(1,6-hexamethylene diisocyanate), which may also be used in combination.

The compositions in accordance with the present invention do not contain blocked isocyanates, and/or the compositions in accordance with the present invention do not contain polyisocyanates reacted with compounds providing hydrophilic groups as defined and disclosed in EP0697424 A1.

Suitable compounds for component b) are lactones containing 4 to 7 carbon atoms preferably selected from the group of δ-valerolactone, γ-butyrolactone, ε-caprolactone. The preferred lactone is ε-caprolactone.

The composition of the present invention may contain component a) in an amount of 60 to 80 weight %, preferably in an amount of 65 to 75 weight % and the most preferable amount is about 70 weight %.

The composition of the present invention may contain the component b) in an amount of 20 to 40 weight %, preferably in an amount of 25 to 35 weight % and the most preferable amount is about 30 weight %.

In an another embodiment, which may be preferred in particular when wishing to further tailor mechanical properties, it may be preferred when the amounts of components a) and b) in the composition in accordance with the present invention are exactly inverse, i.e. when the amount of component a) is in the range of from 20 to 60 weight %, preferably 25 to 40 weight %, more preferably 25 to 35 weight % and most preferably about 30 weight %. Accordingly, the amount of the component b) will be from 40 to 80 weight %, preferably from 60 to 75 weight %, more preferably from 65 to 75 weight % and most preferably about 70 weight %.

These weight percentages are given relative to the total weight of component a) and component b).

As indicated above, component a) may comprise polymeric diisocyanates in combination with monomeric aliphatic or cycloaliphatic isocyanate compounds having at least two isocyanate groups. Of such monomeric compounds diisocyanates are preferred, which may be selected from the group of 1,6-hexamethylene diisocyanate (HDI), isophorone diisocyanate (IPDI), 4,4'-diisocyanato dicyclohexylmethane ($H_{12}$MDI). The preferred monomeric diisocyanate is 1,6-hexamethylene diisocyanate (HDI). This monomeric aliphatic or cycloaliphatic isocyanate compound having at least two isocyanate groups typically is employed in small amounts, i.e. it is preferred when component a) comprises only polymeric isocyanates. When used together, the amount of monomeric isocyanate is typically below 2 weight %, more preferably below 1 weight % based on the overall composition, such as in an amount of up to 0.4 weight %.

As indicated above, the composition in accordance with the present invention comprises components a) and b). In a preferred embodiment the composition in accordance with the present invention consists of these two components, optionally only containing as a third component the conventional polyamide impact modifiers identified below. Preferably, other components are absent (with the only other exception being optional unavoidable impurities) and all compositions described herein are intended for use as activator for anionic polymerization of lactams. Accordingly, the present invention provides compositions for use in the activated anionic polymerization of lactams comprising or consisting of the components discussed herein, in the amounts disclosed.

The process for the production of the composition of the present invention is carried out by mixing the component a) and the component b) in suitable amounts. The process is carried out under substantially water-free conditions preferably under inert gas atmosphere. The composition of the present invention is liquid at temperatures of around 22° C. As a consequence, it can be stored in a separate, unheated storage vessel and metered to the lactam stream containing the catalyst during the casting step, resulting in polyamide formation.

Mechanical properties of the resulting polyamide obtained by the anionic lactam polymerization are substantially improved when using the composition of the present invention. During a cast polymerization process of the lactam to polyamide, the lactone contained in the composition of the present invention is statistically inserted into the polyamide chain and so generating defects in the macromolecular section of the polyamide preventing the entire crystallization of the cast polyamide. These macromolecular defects may be determined by DSC-analysis of the obtained polyamide. The obtained polyamide shows substantially improved elastic modulus and impact strength.

It was surprisingly found that the obtained polyamides show improved impact strength when using the composition of the present invention as a liquid activator even without the addition of any impact modifiers, which simplifies the polymerization process.

In order further to increase the impact strength of the obtained polyamides, additional impact modifiers may however be added to the anionic polymerization of lactams in addition to the composition of the present invention.

Accordingly, it is further possible to add conventional polyamide impact modifiers, such as those selected from the group of polyols, such as polyetheramine (polyoxyalkylene triamine), commercially available under the trade names Jeffamine® (Huntsman), Polyetheramin (BASF) or PC Amine® (Nitroil), Jeffamine® T-403, Jeffamine® T-3000, Jeffamine® T-5000, Polyetheramine T403, Polyetheramine T5000, PC Amine® TA 403, PC Amine® TA 5000 to the composition of the present invention.

Contrary to the problems described in connection with the prior art disclosure (coagulation with conventional liquid activator compositions) no detrimental effect can be seen on the compositions in accordance with the present invention, so that these impact modifiers surprisingly may be employed together with the other essential components of the activator compositions disclosed herein. While it is possible to obtain storage stable compositions when mixing components a) and b) with polyamide impact modifiers, it is nevertheless preferred to mix such impact modifiers with the activator system in accordance with the present invention only shortly before addition to the polymerization system. Nevertheless, in view of the fact that these components may be added to a polymerization system together without detrimental effect, the overall process is facilitated since no separate addition means is required for the impact modifier.

The impact modifiers may be used in an amount of up to 25 weight % (based on the total weight of the composition).

Preferably, the composition of the present invention comprises about 70 weight % (such as 67-73, preferably 68-72 weight %) of component a), preferably poly(1,6-hexamethylene diisocyanate) and about 30 weight % (such as 27-33, preferably 28-32 weight %) of component b), preferably the ε-caprolactone.

As indicated above, for certain applications, it may however also be advantageous to inverse the amounts of components a) and b), i.e. preferred compositions in accordance with the present invention may also comprise about 30 weight % of component a) (such as 27-33, preferably 28-32 weight %), particularly poly(1,6-hexamethylene diisocyanate) and about 70 weight % (such as 67-73, preferably 68-72 weight %) of component b), in particular ε-caprolactone.

The process for the production of polyamide is carried out by the addition of the composition of the present invention to lactam to be polymerized. The composition of the present invention can be added to the pure lactam or to pure lactam melt to be polymerized. Conventional catalysts are employed for polymerization, in accordance with the knowledge of the skilled person.

A suitable amount of the composition of the present invention to be used in the anionic lactam polymerization process can be determined appropriately depending on the physical properties required for the polyamide. Suitable concentrations are 0.1 to 10 weight %, in embodiments 0.1 to 4, preferably 0.5 to 2.5 weight % based on 100 weight % of lactam to be polymerized.

The anionic lactam polymerization is carried out under substantially water-free conditions because water causes decomposition of the anionic polymerization catalyst, leading to reduction in catalytic activity. It is desirable that a contact of the polymerization system with oxygen is avoided as far as possible from the standpoint of prevention coloration of the resulting polyamide.

The anionic lactam polymerization is carried out in a reaction vessel equipped with a stirrer. In this case first ingredient mainly comprising the lactam and anionic polymerization catalyst for lactam and a second ingredient mainly comprising the composition of the present invention and lactam are separately prepared. Prescribed amounts of these two ingredients are mixed and melted. The two ingredients are melted to a temperature to effect polymerization and combined at this temperature.

The reaction is performed at a temperature of from the melting point of lactam up to 200° C. at atmospheric pressure, under low pressure or in vacuo. The polymerization reaction is completed within one hour.

Any catalyst known for anionic polymerization of lactams which may be used in the usual concentrations can be applied. Alkali metal lactamates are preferred of which sodium lactamate is mostly preferred.

The addition of the composition of the present invention to the lactam melt which is to be polymerized is carried out either continuously or discontinuously. The composition according to the invention is preferably suitable for the discontinuous polymerization of lactams to obtain polyamides, most preferable for discontinuous polymerization of ε-caprolactam to obtain polyamide, particularly PA-6.

The composition in accordance with the present invention in particular may be used in polymerization reactions which are carried out for preparing large sized polyamide moldings and/or hollow bodies and typical fields of applications are in the field of rotomolding, or resin transfer molding processes which may in particular, be used in order to prepare moldings which comprise fiber reinforcements (employing molds which already comprise the fiber reinforcement) so that either the polymerization is carried out in the presence of this fiber reinforcement or the polymerized melt is brought into contact with the reinforcement, so that the final polyamide impregnates and covers the fiber reinforcement.

The composition of the present invention is used as an activator for anionic lactam polymerization and is soluble in the lactam to be polymerized. The composition of the present invention serves as an accelerator for lactam polymerization and provides a comonomer component to constitute a part of the resulting polyamide.

The composition according to the invention may be used for the production of shaped products and articles comprising said shaped product.

The present invention will now be explained in greater detail by way of the following Examples. In these Examples, the percents are by weight unless otherwise indicated.

EXAMPLES AND COMPARATIVE EXAMPLES

Commercial Materials
BRUGGOLEN® C230 (L. Brüggemann): poly(1,6-hexamethylene diisocyanate) (polyHDI) (CAS 28182-81-2); N-methyl pyrrolidone (NMP) (CAS 872-50-4);
BRUGGOLEN® C231 (L. Brüggemann): poly(1,6-hexamethylene diisocyanate) (polyHDI) (CAS 28182-81-2), N-ethyl pyrrolidone (NEP) (CAS 2687-91-4);
BRUGGOLEN® C20P (L. Brüggemann): blocked 1,6-hexamethylene diisocyanate in ε-caprolactam, 18-20% (CAS 5888-87-9);
BRUGGOLEN® C10 (L. Brüggemann): 17-19 weight % of sodium ε-caprolactamate in ε-caprolactam (CAS 2123-24-2, 105-60-2);
1,6-hexamethylene diisocyanate (CAS 822-06-0).
Analytical Methods
Method Analysis BRGC 206
Method Analysis BRGC 206 is used to determine the reactivity of catalysts for the anionic polymerization of caprolactam in a short time test.

Molten ε-caprolactam (technical, moisture <0.02%), catalyst (BRUGGOLEN® C10 (L. Brüggemann)) and activator polymerize giving polyamide. During the process there are different stages of polymerization. These differences are classified visually.

Procedure —Weigh out each into two test glasses (A and B) 18.75 g caprolactam. —Close the test glasses with a plug of cork. —Place the test glasses in the oil bath to melt the caprolactam. —Add 1.5±1 g BRUGGOLEN® C10 to the melt caprolactam in test glass A. —Add 0.5-0.55 ml HDI to the molten caprolactam in test glass B by using the automatic burette and mix thoroughly with the glass rod. —1.050±0.001 g BRUGGOLEN® C20(P), C230, C231 or the composition of the present invention are weighed on the analytical balance and filled to test glass B. —After that homogenize with a glass stirrer. —At 130±1° C. (direct measurement of temperature in the test glass A) take the test glass A from the oil bath and add the contents of test glass B to test glass A. Close test glass A with the plug again, mix the molten material thoroughly by vigorous shaking and place it in the bath. At the same time start the stop-watch. —The stages of polymerization are analyzed visually. The time is measured for each of the three phases.

Classification

Phase 1 (T1), viscous; the molten mass does not move during light rotation of the test glass; Phase 2 (T2), turbid; the clear melt starts to cloud; Phase 3 (T3), loosening of polymerized mass from the test glass wall; the melt starts to loosen itself from the wall in the upper region of test glass.

The storage ability of the composition of the present invention is demonstrated in Table 1 and has been evaluated in glass bottles in a desiccator at 22° C. (desiccant: orange gel) and in an oven at 40° C. Trace amounts of water in the composition have been determined by Karl Fischer titration.

For the for the tensile strength tests presented in Table 2, test blocks of a size of 11 Mm×170 mm were used. E-modulus-, $\sigma_{M-}$, $\epsilon_{M-}$, $\sigma_{B-}$, and $\epsilon_{B}$-values have been evaluated using EN ISO 527 norm.

DSC-analysis (differential scanning calorimetry) has been carried out using DIN EN 31357-1 norm.

Activator Compositions

Example 1

The activator composition of the present invention is obtained by mixing 70 weight % of poly(1,6-hexamethylene diisocyanate) (component a)) with 30 weight % of ε-caprolactone (CAS 502-44-3) (component b)) at 22° C.

Comparative Examples 1 to 3 are commercially available activator compositions.

Comparative Example 1

BRUGGOLEN® C230 (L. Brüggemann): poly(1,6-hexamethylene diisocyanate) (Merck, CAS 28182-81-2) in N-methyl pyrrolidone (NMP) (CAS 872-50-4),

Comparative Example 2

BRUGGOLEN® C231 (L. Brüggemann): poly(1,6-hexamethylene diisocyanate) (CAS 28182-81-2) in N-ethyl pyrrolidone (NEP) (CAS 2687-91-4)

Comparative Example 3

BRUGGOLEN® C2OP (L. Brüggemann): blocked 1,6-hexamethylene diisocyanate in ε-caprolactam The polymerization activity has been measured according to the test tube method BRGC 206 outlined above (Table 1).

Values T1 to T3 represent the starting point of the polymerization (T1), crystallization of insoluble polymers (T2) and shrinking due to crystallization during the polymerization (T3).

TABLE 1

| Composition | Stock location | Viscosity [mPa.s] | Water content [w. %] | Reactivity T1 [s] | T2 [s] | T3 [s] |
|---|---|---|---|---|---|---|
| Example 1 | desiccator | 178.96 | 0.0199 | 45 | 71 | 162 |
| Comparative Example 1 | desiccator | 75.48 | 0.0113 | 48 | 72 | 152 |
| Comparative Example 2 | desiccator | 97.98 | 0.0163 | 43 | 73 | 154 |
| Example 1 | oven | 178.96 | 0.0199 | 45 | 71 | 162 |
| Comparative Example 1 | oven | 75.48 | 0.0113 | 48 | 72 | 152 |
| Comparative Example 2 | oven | 97.98 | 0.0163 | 43 | 73 | 154 |
| 8 weeks later: | | | | | | |
| Example 1 | desiccator | 167.46 | 0.0177 | 35 | 53 | 110 |
| Comparative Example 1 | desiccator | 71.48 | 0.0130 | 37 | 59 | 170 |
| Comparative Example 2 | desiccator | 94.48 | 0.0156 | 39 | 60 | 150 |
| Example 1 | oven | 169.46 | 0.0155 | 40 | 62 | 170 |
| Comparative Example 1 | oven | 77.98 | 0.0198 | 39 | 61 | 152 |
| Comparative Example 2 | oven | >500 | 0.0337 | 41 | 65 | 170 |

As can be taken from Table 1, viscosity of the activator composition of the present invention remains constant. Conventional activators show at elevated temperatures significantly increased viscosities as can be seen in Comparative Example 2. The activator composition of the present invention does not show any yellowing even at 40° C., whereas the activator of the prior art shows yellowing at 40° C., which can be determined visually.

Further, the activator composition of the present invention does not contain any toxic substances when compared to conventional activator system of Comparative Example 1. Additionally, smell nuisance can be reduced when using the composition of the present invention, since caprolactone has a boiling point of 235° C. and conventional lactam polymerization is carried out at up to 200° C. (boiling point of NMP is 203° C. and of NEP 212° C.).

Polyamides Obtained with the Activator Composition

Example 2

In two glass round bottom flasks A and B 400 g of ε-caprolactam in each are placed and melted in an oil bath at 150° C. (temperature of the molten ε-caprolactam is 100° C., measured in the flask). Then, both flasks are flushed with nitrogen. 6.4 g of sodium caprolactamate catalyst (BRUGGOLEN® 10) is added to the molten ε-caprolactam flask A and stirred with a glass rod. After complete homogenization of mixture B, 5.6 g of the composition of the present invention (Example 1) is added to the flask B and heated to melt. After both melts (A and B) are homogenized, melt B and melt A, having 135° C. are simultaneously filled in a casting mold which was flushed with nitrogen gas before filling both melts A and B into the mold. The polymerization reaction is completed within 30 minutes.

Comparative Example 4

In two glass round bottom flasks A and B 400 g of ε-caprolactam in each are placed and melted in an oil bath at 150° C. (temperature of the molten ε-caprolactam is 100° C.). Then, both flasks are flushed with nitrogen. 6.4 g of sodium caprolactamate catalyst (BRUGGOLEN® 10) is then added to the molten ε-caprolactam flask A. Subsequently, 1.8 mL of 1,6-hexamethylene diisocyanate (HDI) are added to the flask B and stirred with a glass rod. After complete homogenization of this mixture, 5.6 g of BRUGGOLEN® 230 is added to the flask B, heated to melt. After both melts (A and B) are homogenized, melt B and melt A, having 135° C. are simultaneously filled in a casting mold which was flushed with nitrogen gas before filling both melts A and B into the mold. The polymerization reaction is completed within 30 minutes.

Comparative Examples 5 and 6 were similarly prepared as Comparative Example 4, where BRUGGOLEN® 231 (Comparative Example 5) or BRUGGOLEN® 20P (Comparative Example 6) were used as activators in same amounts instead of BRUGGOLEN® 230 (Comparative Example 4).

TABLE 2

| | | Tensile Strength | | | |
|---|---|---|---|---|---|
| Polyamide | E-Modulus [MPa] | $\sigma_M$ [MPa] | $\epsilon_M$ [%] | $\sigma_B$ [MPa] | $\epsilon_B$ [%] |
| Example 2 | 2280 | 61.7 | 24 | 55.1 | 32 |
| Comparative Example 4 | 2400 | 64.1 | 25 | 57.9 | 36 |
| Comparative Example 5 | 1960 | 60.1 | 33 | 52.1 | 45 |
| Comparative Example 6 | 3160 | 83.3 | 5.2 | 82.0 | 5.8 |

As can be seen from the Table 2, the obtained polyamide block when using the activator composition of the present invention shows improved elongation at break values. $\epsilon_B$ value of Example 2 is 32% versus $\epsilon_B$-value of Comparative Example 6 is 5.8%. The elastic modulus (E-Modulus) of the polyamide of the Example 2 is significantly lower (2280 MPa) than the elastic modulus of the polyamide of the Comparative Examples 4 and 5.

Additional experiments in accordance with the previous description were carried out using activator compositions consisting of poly(1,6-hexamethylene diisocyanate) and ε-caprolactone with the only exception that the ratio (by weight) of these components was changed from 70:30 (Example 1) to about 30:70, while at the same time increasing the total amount of activator composition used so that the absolute amount of component a) remains unchanged (based on the total weight of the polymerization composition). Making this modification in accordance with the present invention resulted in polyamide compositions with highly satisfactory mechanical properties and by further varying the total amount of component b) in the polymerization system (by appropriately readjusting the activator composition), it was possible to tailor mechanical properties. With increasing amounts of component b), stiffness is reduced, while tensile strength is likewise reduced, whereas tensile elongation increases. Break stress is likewise reduced with increasing content of component b) while elongation at break and impact strength increase, as well as residual monomer content. With decreasing content of component a) stiffness increases, tensile strength increases, tensile elongation decreases, break stress increases, elongation at break decreases while residual monomer content in the final molding decreases while impact strength also decreases.

Overall, it is therefore readily apparent that the activator system and composition in accordance with the present invention provides a very advantageous option to tailor properties of the final polyamide molding by increasing or decreasing the amounts of components a) and b), respectively, as well as their weight ratio. As outlined above, the composition in accordance with the present invention is highly stable and provides less environmental or safety or health concerns compared with prior art compositions, so that the possibility to tailor properties of a polyamide molding during polymerization thereof is enabled without increasing health or environmental hazard.

Overall, the viscosity of the compositions of the present invention remain constant at elevated temperatures. The compositions of the present invention do not show any yellowing even at 40° C., whereas activator compositions of the prior art show yellowing at 40° C. Further, the compositions of the present invention do not contain any toxic substances when compared to conventional activator systems. Additionally, smell nuisance can be reduced when using the composition of the present invention.

What is claimed is:

1. A process for the production of polyamide by anionic lactam polymerization, comprising first preparing under suitable conditions a composition consisting of a component a) comprising at least one aliphatic isocyanate compound having at least two isocyanate groups; a component b) comprising at least one lactone containing 4 to 7 carbon atoms; and an optional impact modifier; and then adding a suitable amount of the composition to a suitable amount of a lactam under anionic lactam polymerization conditions to produce a polyamide.

2. The process according to claim 1, wherein the composition is added in an amount of from 0.1 to 10 weight % based on 100 weight % of the lactam.

3. The process according to claim 1, wherein the composition is added in an amount of from 0.1 to 4 weight % based on 100 weight % of the lactam.

4. The process according to claim 1, wherein component a) comprises poly(1,6-hexamethylene diisocyanate).

5. The process according to claim 1, wherein component b) comprises $\epsilon$-caprolactone.

6. The process according to claim 1, wherein the composition comprises component a) in an amount of 20 to 80 weight %.

7. The process according to claim 1, wherein the composition comprises component a) in an amount of 60 to 80 weight %.

8. The process according to claim 1, wherein the composition comprises component a) in an amount of 20 to 40 weight %.

9. The process according to claim 1, wherein the composition comprises component b) in an amount of 20 to 80 weight %.

10. The process according to claim 1, wherein the composition comprises component b) in an amount of 20 to 40 weight %.

11. The process according to claim 1, wherein the composition comprises component b) in an amount of 60 to 80 weight %.

12. The process according to claim 1, wherein the composition consists of component a) and component b).

* * * * *